United States Patent
Sial et al.

(10) Patent No.: US 10,825,134 B2
(45) Date of Patent: Nov. 3, 2020

(54) SYSTEM AND METHOD FOR SCALING CONTENT ACROSS MULTIPLE FORM FACTORS

(71) Applicant: Owned Outcomes Inc., Las Vegas, NV (US)

(72) Inventors: Huzaifa Sial, Las Vegas, NV (US); Anita Pramoda, Las Vegas, NV (US); Chandan Singh, Las Vegas, NV (US); Rohan Singh Rajput, Las Vegas, NV (US); Dharini Govindarajan, Las Vegas, NV (US); Krupa Srinivas, Las Vegas, NV (US)

(73) Assignee: Owned Outcomes Inc., Las Vegas, NV (US)

( * ) Notice: Subject to any disclaimer, the term of this patent is extended or adjusted under 35 U.S.C. 154(b) by 0 days.

(21) Appl. No.: 15/940,409

(22) Filed: Mar. 29, 2018

(65) Prior Publication Data

US 2019/0304060 A1 Oct. 3, 2019

(51) Int. Cl.
*G06T 3/40* (2006.01)
*G06T 11/60* (2006.01)

(52) U.S. Cl.
CPC .............. *G06T 3/40* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 9,710,873 B1* | 7/2017 | Hill | G06T 1/20 |
| 2005/0195157 A1* | 9/2005 | Kramer | G06F 3/04845 |
| | | | 345/156 |
| 2007/0136685 A1* | 6/2007 | Bhatla | G09G 5/14 |
| | | | 715/800 |
| 2008/0072252 A1* | 3/2008 | Morris | H04N 5/44591 |
| | | | 725/38 |
| 2012/0144324 A1* | 6/2012 | Kruglick | G06F 9/451 |
| | | | 715/762 |
| 2013/0328878 A1* | 12/2013 | Stahl | G06F 3/1431 |
| | | | 345/428 |
| 2014/0139736 A1* | 5/2014 | McCoy | H04N 7/0122 |
| | | | 348/445 |
| 2014/0300643 A1* | 10/2014 | Urosev | G06T 11/006 |
| | | | 345/660 |
| 2015/0139603 A1* | 5/2015 | Silverstein | H04N 5/23216 |
| | | | 386/225 |
| 2018/0203578 A1* | 7/2018 | Murphy | G06F 9/451 |

* cited by examiner

*Primary Examiner* — Steven Z Elbinger
(74) *Attorney, Agent, or Firm* — Knobbe, Martens, Olson & Bear, LLP

(57) ABSTRACT

Active Design maintains overall active and inactive space of a display by scaling active display components on a screen according to active and inactive blocks. By scaling the blocks relative to the screen size and maximizing active display components for 'best-fit' within the scaled blocks, a predictable scaling system is created that can deliver a more consistent experience for users across multiple form-factors. Active Design allows designers to use a single base display resolution for an entire class of form-factors and uses grid blocks to arrange elements.

18 Claims, 7 Drawing Sheets

SYSTEM AND METHOD FOR SCALING CONTENT ACROSS MULTIPLE FORM FACTORS

BACKGROUND

Field of the Invention

The present application is directed generally to the field of scaling content displayed on a screen, and more particularly to methods and systems for scaling active display components asymmetrically across multiple form-factors.

Description of the Related Art

Current methods of scaling content displayed on a screen use measurements (fixed or relative) at an element-based level (e.g., length, width, height etc.). Such methods offer unpredictable and often unusable scaling results. Adding predictability and consistency to these scaling methods requires designers and developers to create multiple layouts across various resolutions, aspect ratios and form-factors. As used herein, "form-factor" refers generally to the size, configuration, or physical arrangement of a computing device/screen). Thus, adding predictability and consistency generates a burden on designers by forcing them to account for the wide variety of form-factors, and create multiple conditional designs to satisfy each type of form-factor.

The current methods of handling the reformat of content displayed on multiple user interfaces can be categorized under three designs: fixed design, fluid design and responsive design. Fixed designs assign absolute measurements to active display components, such that the content does not change as the form-factor changes. Fixed designs may anchor active display components to specific x,y coordinates in the display and keep absolute sizes, even when form factor changes. Fixed designs have limited scope with regard to scaling and can fall apart easily as resolutions or form-factors change. Fixed designs are easy to control for one screen size but will not necessarily adapt to different screen sizes.

Fluid design, also known as elastic design, assigns a combination of absolute and relative units that are based on screen ratios of a client device. Although fluid designs can change size based on changes in form-factors, fluid designs are limited to relatively simplistic ratio rules. This can make the displayed content become distorted or spaced in unpredictable patterns that may limit the usability of the content. These issues can create an inconsistent and undesirable experience for the user. Fluid designs anchor active display components to specific x,y ratios on the screen and keep relative sizes of the components constant. Fluid designs may scale well with content that can change sizes easily using a constant aspect ratio, but becomes unpredictable when screen length and width scale at different amounts.

Finally, responsive designs (or adaptive designs) may use both absolute and relative measurements, but add rule-based triggers that modify an interface display when predetermined conditions are met. Responsive designs add and remove fluid elements based on predetermined rules using media queries or other conditional code. Each display page is designed multiple times for different form-factors (e.g. wide-screen monitor, laptop, tablet, mobile etc.). As form-factor changes, the active display components are modified, hid, or added to provide a reasonably consistent and predictable experience for the user. Responsive design may add burdens on both designers and developers by requiring multiple layers of development and maintenance.

Each of the above-mentioned designs scale the content on a user interface using individual element dimensions (length, width, height, size, padding etc.), which can create limitations on overall harmony of the design because the balance of positive (occupied) space and negative (empty) space is not being considered. By failing to consider for the overall balance of occupied and empty space, predictability is difficult to achieve and rigorous testing is needed to create predictable and functional scaling.

SUMMARY

One embodiment is an electronic method for scaling and displaying content displayed on a screen to a user. This embodiment may comprise: analyzing displayed content to determine active blocks having active display components and blank space areas having no active display components; determining a new form factor for the content to be displayed; scaling the content to maintain the approximate ratio of active blocks to blank space areas within the new form-factor; modifying the size or shape of the active display components within each active display are area according to preset parameters to enhance the presentation of the data within the active blocks to the user; and displaying the active blocks and modified active display components to the user.

Another embodiment is an electronic system for scaling content displayed on a screen. This embodiment may comprise: a display having a form factor configured to display content from a prior form factor; a processor configured to execute instructions that perform a method comprising: analyzing displayed content to determine active blocks having active display components and blank space areas having no active display components; determining the form factor of the display; scaling the content to maintain the approximate ratio of active blocks to blank space areas within the form-factor based on the prior form factor; modifying the size or shape of the active display components within each active display are area according to preset parameters to enhance the presentation of the data within the active blocks to the user; and displaying the active blocks and modified active display components to the user in the form factor.

DETAILED DESCRIPTION

Figure 1:
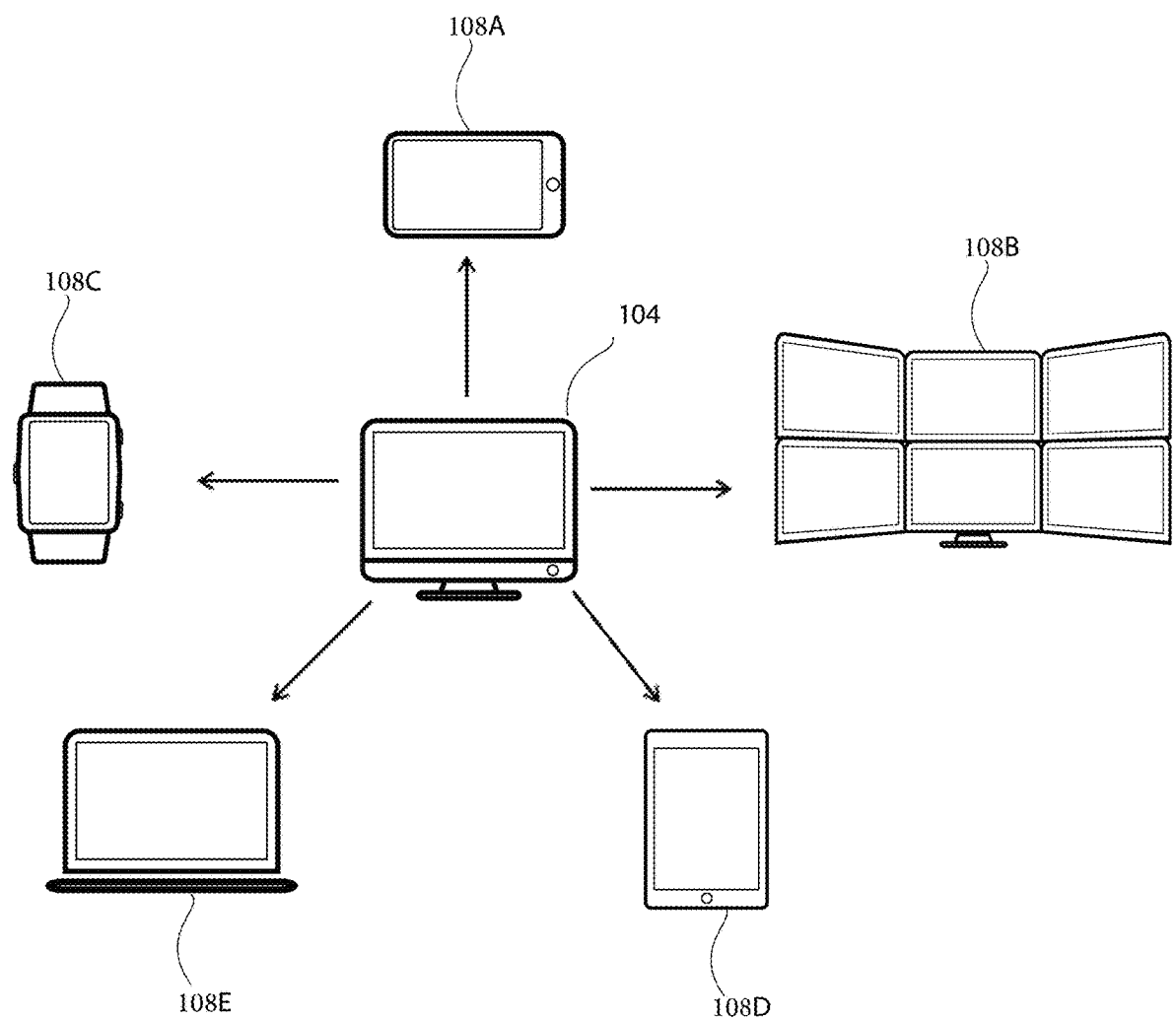
FIG. 1 illustrates an example representation of content being distributed across multiple form-factors.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

Overview

Growth in processing capabilities and display technology is creating new and unique form-factors that are pushing the limits of current user interface scaling methods. The wide range of screen configurations is causing display fragmentation at an increasing pace. As discussed above, current methods being used to scale user interfaces across multiple screens are insufficient to provide a concise and consistent experience for the user. Disclosed herein are systems and methods for scaling content displayed on a screen, hereafter referred to as "Active Design". Active Design maintains the overall positive (active) and negative (inactive) space by defining the expected occupancy area for each active display component being displayed. As used herein, the term "widget" is used to denote an active display component. For instance, a widget can be an element of a graphical user interface or a combination of elements that are used to display information to a user or provide a specific way for a user to interact with the operating system or an application. For example, types of widgets include text boxes, image containers, icons, pull-down menus, configuration buttons, selection boxes, interactive progress indicators, scrollable lists, windows, toggle buttons, form, data visualizations and many other devices for displaying information and for inviting, accepting, and responding to user actions.

Embodiments of an Active Design system may rely upon relative measures to scale specific active components or elements. In general, absolute measures, such as pixels, points, or the like are not used within an Active Design system. When programming for size and positioning, each absolute value may be converted to its relative counterpart by using the base resolution of the display as a denominator. This allows each element (such as an object or font) to be scalable through a single variable, or group of variables, that can be modified as the form factors change. Of course, the above is just one way of defining relative sizes. Another approach may be to convert each component into relative sizes based on the active block that contains it. This may allow greater control on scalability as active blocks are independently scaled.

For example one embodiment is an Active Display system that includes software and processes running on a processor that can scale content displayed on a screen. This embodiment includes software modules that analyze the content to be displayed to determine active blocks of content that include active display components and blank active areas that have no active display components. The system then determines a new form factor for the content to be displayed within the active block. In some embodiments, the processor is configured to maximize the size of the active display components while maintaining their aspect ratio, and while constraining the active display components to remain within their active block.

The system, for example, may read form factor data of a target display from a memory associated with the new form factor. The form factor data may include the new form factor's resolution, width and height in pixels, and orientation, such as landscape or portrait. The data returned may include the size and shape of the target display, along with the display resolution and number of pixels per inch to display. Once the target display is identified, the system will scale the content to maintain the approximate ratio of active blocks to blank space areas within the new form-factor. It should be realized that each active block may include one or more widgets or other display components. Once the ratio of active blocks and blank space areas are determined, the system may modify the display of the active display components within each active block according to preset parameters to enhance the presentation of the data within the active blocks to the user. As used herein, the preset parameters may include aspect ratio locking, content justification, left or right align scaling, and the like.

Active design systems may be implemented on a variety of multi-display systems and can include a software, modules and programs for scaling content displayed on a screen. The system can include a first active display component, such as an image. The system can include a second active display component, such as a text box. The first active display component may be contained in a first active block and the second active display component may be contained in a second active block. The first active block may include a property of a first scaling multiplier. The first scaling multiplier determines the rate that the first active block scales in response to a change in form factor. Similarly, the second active block may include a property that of a second scaling multiplier that determines the rate that the second active block scales in response to the change in form factor. In this embodiment, the first scaling multiplier and the second scaling multipliers may be based on the first active display component and second active display component respectively. The first active display component and the second active display component may be configured to maximize their size while maintaining a predetermined aspect ratio within the first active block and the second active block respectively.

Categorizing Form-Factors and Selecting Base Resolution

Embodiments of the inventive Active Design system enable the creation of a single design for each category of a type of form-factor. Form factors may include a landscape form factor that could be used with typical laptops, desktops and tablets. Another form factor may be a portrait form factor that is also used with desktops, laptops, and tablets when they are displaying content in a portrait mode. Another form factor may be a mobile form factor that can cover relatively small screens, such as those on smart phones, small tablets and e-reader devices. The creation of these designs is in contrast to creating a screen design for each resolution-set, as done in responsive designs. Using the methods described below, Active Design encourages entirely separate designs as information complexity and layout changes with each type of content being displayed to a user.

According to certain embodiments, Active Design can involve determining the scope of all possible form-factors that may be utilized by a subject to interact with a specific application or user interface. The determined form-factors can then be organized into categories that are divided by shape (e.g., portrait, landscape, square, etc.) and complexity (e.g., computer, mobile, etc.). Each orientation and complexity level can be independently evaluated to ensure the current design meets the shape and complexity expectations of the user. This ensures that users are being presented the correct 'type' of information for their device.

FIG. 1 illustrates an example representation of the type of form factors that can be used to display content using Active Design. For example, content may be initially developed to display on a single computer monitor form-factor 104. However, using the Active Design system and methods, the content displayed on the monitor 104 can be formatted for proper display across a variety of other form factors. For example, the same content may be displayed on a cell phone 108A in landscape mode. The content may be displayed on a multi-monitor setup 108B wherein portions of the content from the display 104 are either properly divided among each monitor of the multi-monitor setup 108B, or properly displayed on a single monitor of the multi-monitor setup 108B. Content formatted for the single monitor 104 can also be displayed on a digital watch 108C, a tablet 108D in portrait mode, or a laptop 108E using the systems and method described herein.

For each form-factor category shown in FIG. 1, a single base resolution can be first selected to simplify the design and development process. The base resolution can be selected based on any suitable grounds. For instance, the base resolution can be selected from a preferred or most common form-factor, by calculating a composite (e.g., average size or weighted average of form-factors), or by selecting any custom resolution that follows an orientation pattern of the category of form-factor. A design can then be generated on the selected base resolution, with all sizes, ratios, spaces, and positions generated based on the selected base resolution. Example resolutions may be 1024×768, 1152×648, 1280×720, 1366×768, 1600×900, 1920×1080, 2560×1440 and 3840×2160 or other pixel width×height values known to those of skill in the art.

Widgets and Active Blocks

FIG. 2A illustrates a first screen 204 that includes several active display components, or widgets. As described above, a base resolution can be selected for screen 204 prior to generating the design. Displayed it the upper central portion of the screen 204 is a first large widget 208a that includes several design components. Surrounding the large widget 208a is an active block 212a that includes a boundary illustrated by the broken line surrounding the designated active block. As shown, there are blank spaces 213a and 213b formed between a left edge 215a and a right edge 215b of the widget 208a and the boundary of the active block 212a. A component using an Active Design has both the active block portion that includes the widget and one or more blank space portions located between the outer boundary of the active block and the borders of the widget.

Within the screen 204 are also a set of four smaller widgets 208b, 208c, 208d, and 208e located below the first large widget 208a. The boundaries of the smaller widgets are depicted as boxes with solid bold lines. Surrounding the smaller widgets 208b, 208c, 208d and 208e are active blocks 212b, 212c, 212d, and 212e. The boundaries of the active blocks are depicted as boxes with dashed lines. Active blocks can define spaces that fully contain widgets and all their elements. In some embodiments, active blocks can comprise areas or spaces that fully contain a widget and all its elements and spacing that might be associated with those elements. The spaces occupied by the active blocks act as scaling container for the widgets. In use, the active blocks act to constrain the size of the widgets residing within the active block. For example, as illustrated, active block 212a contains widget 208a as well as additional blank spaces 213a and 213b that are not within the boundaries of widget 208a. Similarly, active block 212b includes smaller widget 208b as well as an upper blank space 213c and lower blank space 213d that are not within the boundaries of the widget 208b.

In embodiments of the invention, as the content is displayed on a new form-factor, each active block is configured to maintain its size ratio and position with respect to the screen. Once an active block is defined, it can be scaled throughout a particular form-factor category. Active blocks can be defined relative to the presentation area, scale and shape of the form-factor on which they are being displayed.

In some embodiments, the system further comprises inactive blocks (not shown). Inactive Blocks can be areas of a display that do not contain any scalable widgets. Such areas can be considered negative space by the user. For example, an inactive block may be blank or contain non-essential elements of design. Inactive blocks can be controlled independently of the active blocks. In some embodiments, inactive blocks are not created separately for all empty area in the display. Inactive blocks can be configured to prevent an interface from over-scaling by defining inactive blocks. Thus, interactive widgets can be contained within active blocks, while non-scalable/non-adaptable elements can be designated as inactive blocks.

FIG. 2B illustrates a screen 216 including the active blocks 212a-e and the widgets 208a-e of FIG. 2A in a new form factor. As illustrated, screen 216 is taller than screen 204 of FIG. 2A, but with the same width. The widgets 208a-e and active blocks 212a-e within screen 216 are the same components as shown in screen 204, except that the widgets 208a-e and active blocks 212a-e have scaled to fit the form factor of the new screen 216.

By comparing screen 204 of FIG. 2A and screen 216 of FIG. 2B, it can be seen that each active block 212 roughly maintains its percentage size in the overall screen display (e.g., for 1-1 scaling weight). Once the active blocks 212a-e have scaled according to the dimensions of the new screen 216, the widgets 208a-e are configured by the Active Display system to find their best fit within the active blocks 212a-e while maintaining their aspect ratio. That is, the widgets are configured to maximize their size while remaining within the boundaries of the active block and maintaining their aspect ratio.

As height or width of the screen changes, the active blocks are expanded and/or contracted accordingly. The widgets are then scaled based on the constraints of their associated active blocks. For example, as illustrated in FIG. 2A, widget 208a is contained within active block 212a such that additional blank spaces 213a' and 213b' are found in the X dimension, but no space exists in the Y dimension between widget 208a and active block 212a. Because widget 208a is configured to maintain its aspect ratio, the Active Design system does not increase its vertical size beyond the border of the active block 212a when reformatted for the new screen. Doing so would either change its aspect ratio or exceed the boundaries of active block 212a. However, referring to FIG. 2B, active component 212a was scaled in the Y dimension according to the increased height of screen 216. Thus, widget 208*a* scaled within active block 212*a* until it reached the boundary of active block 212*a*. Likewise, it can be seen that widgets 208*b-e* did not scale in any dimension between screens 204 and 216 because there was no excess space in the X dimension between the widgets 208*b-e* and their active blocks 212*b-e*. Accordingly, because screen 216 only increased in the Y dimension, widgets 208*b*, 208*c*, 208*d*, and 208*e* remain constrained along the X dimension and were not scaled in the Y dimension because that would have disturbed the aspect ration of the widgets 208*b-d*.

Thus, according to embodiments of the invention, the scaling rate for widgets can be dependent on the screen area, the widget size and aspect ration, and the size of the active block area. In some embodiments, widgets with different shapes may scale differently within the similar active blocks. Similarly, multiple widgets on the same screen may also scale asymmetrically to each other. Asymmetric scaling can provide design harmony while maximizing visibility by maintaining active and inactive block ratios and by allowing widgets to independently find their maximum displayable size.

Creating a Grid

Figure 2:
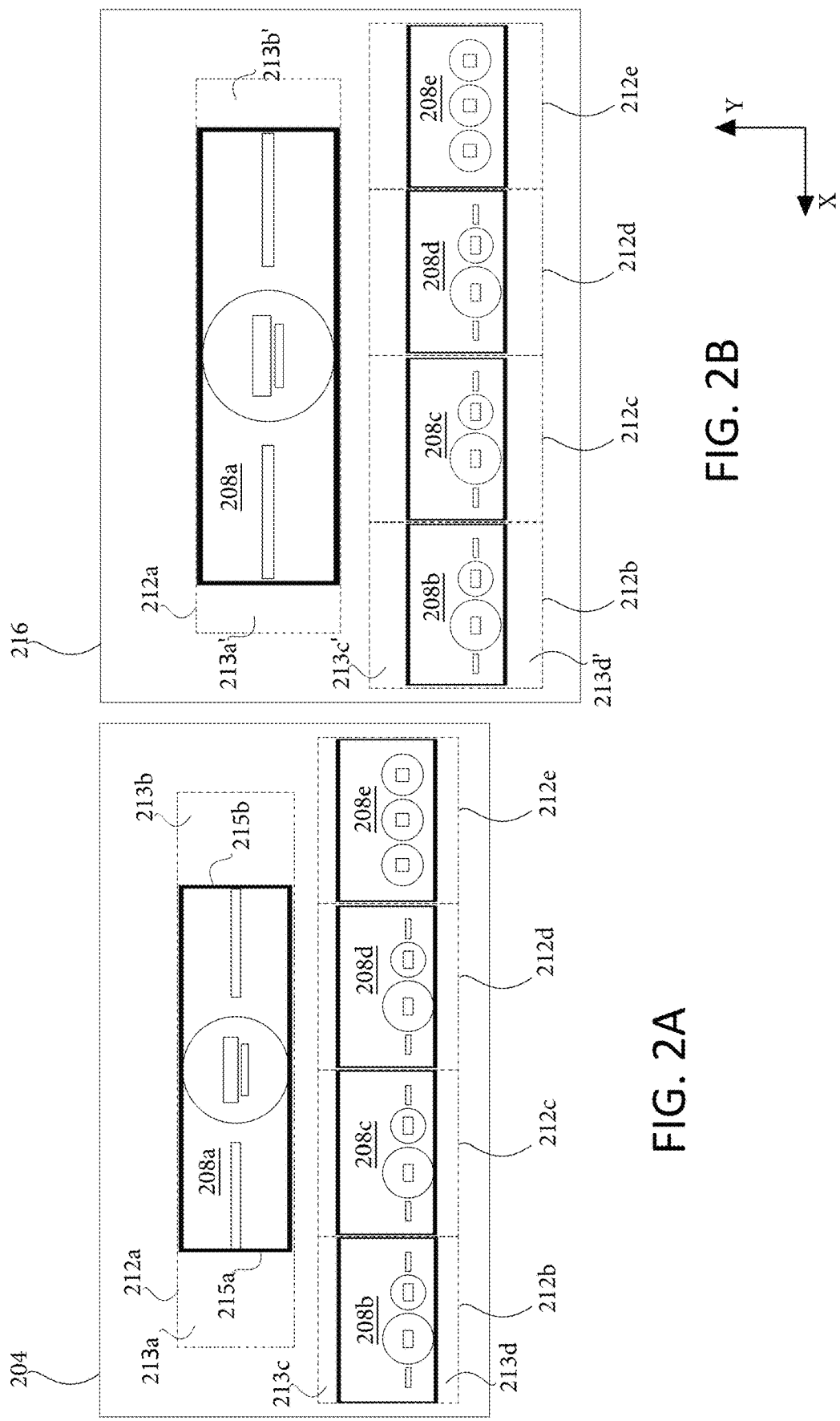
FIG. 2A is a schematic illustration showing a display including widgets and active blocks.
FIG. 2B is a schematic illustration showing a display including the widgets and active blocks of FIG. 2A, scaled according to a new form-factor.
Figure 3:
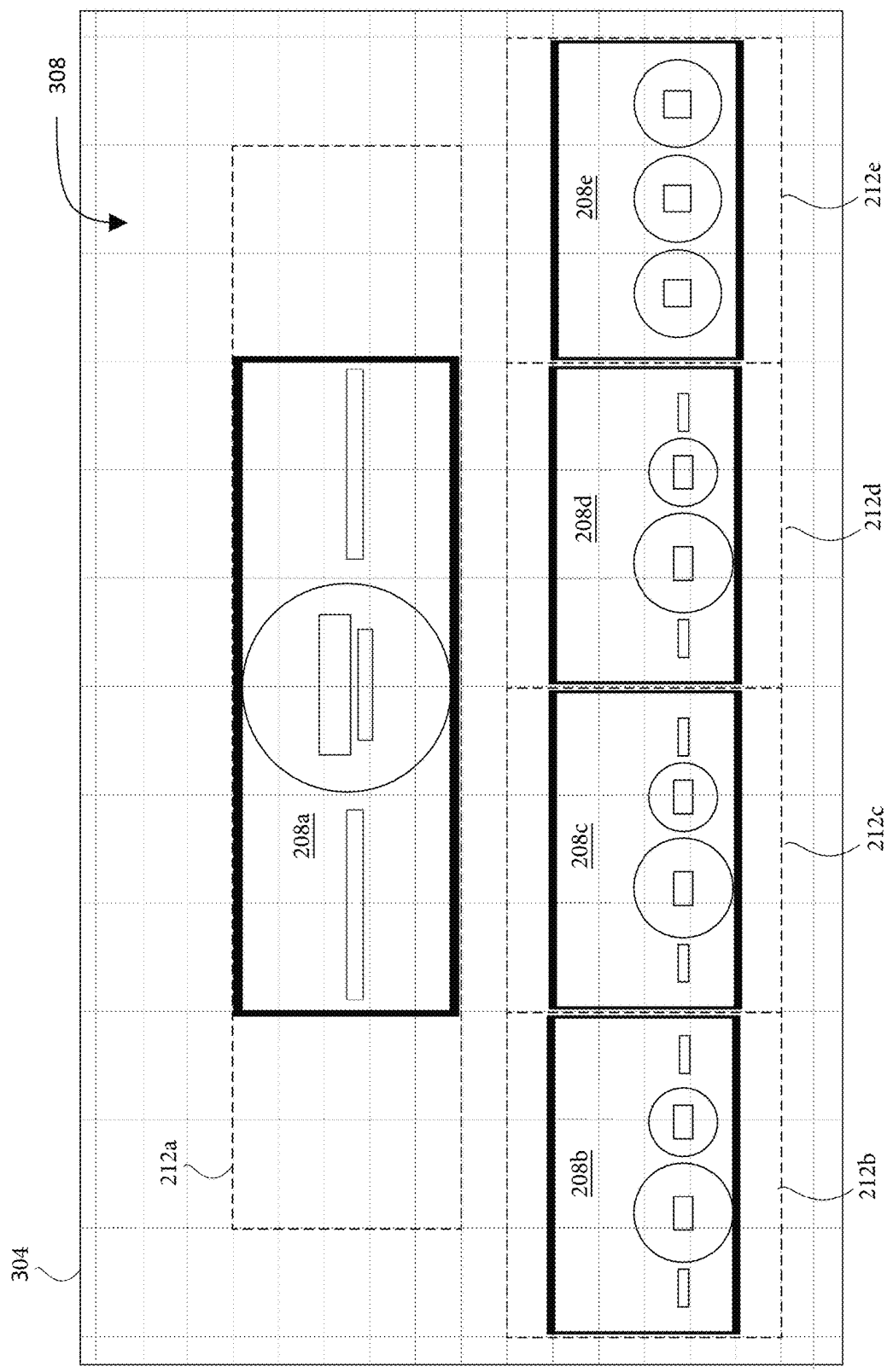
FIG. 3 is a schematic illustration of the display of FIG. 2A, further comprising a grid overlay.

FIG. 3 illustrates a screen 304 including a grid overlay 308. Also illustrated are widgets 208*a-e* and active blocks 212*a-e* as discussed above with reference to FIGS. 2A and 2B. In some embodiments, grid overlay 308 is generated for each base resolution of a form-factor category. Grid overlay 308 can serve as the basis for scaling, adaptability, and block definition. The grid overlay 308 can be utilized as a sub-unit guide to define active and inactive blocks within a screen. For instance, active blocks 212*a-e* can be defined as the space composed of grid units or partial grid units that fully contain widgets 208*a-e* and all their elements and spacing that is associated with those elements. As with active blocks 212*a-e*, the grid overlay 308 can be configured to adapt to match the presentation area, scale, and shape of a new form-factor on which it is displayed. For instance, the grid overlay 308 can be configured to stretch, skew, bend, etc. to maintain consistency as the display area changes form when being displayed on a new form factor. This adaptability allows widgets 208 to maintain their relative positions, using the grid overlay 308 as a guide.

Grids used within such an overlay can be asymmetrical, symmetrical, or have additional modifications that serve design needs. Multiple grids can be created to suite the needs of the interface as well as the target form-factors. Once a base grid is selected, it can become the basis for design, with designed elements and widgets being aligned on the grid for consistency.

A grid can also be defined under the fold (i.e., the portion of a screen that is not visible without scrolling). The length of the page is not limited to the visible screen area and a grid can continue as required by longer pages.

In some embodiments, grids can be used for methods of quality testing and design compliance. Once a design is completed, it can be produced in multiple versions with a grid overlay. A design that is released with grid overlay can be used to communicate size and positioning of the design elements. Using a grid, the location of each element is easily identified based on where an elements lies on the grid. This can help avoid layers of documentation and guidelines on each element.

Similarly, once the interface is developed using the design overlay guidelines, it can be tested for design adherence by projecting the same grid, in the selected base resolution, on the completed interface. This allows verification of each element's location. Furthermore, a scaling grid can enable the scaling adherence of blocks and widgets to be verified.

Scaling Multipliers

As discussed above, scaling properties of widgets can be managed through the size and shape of the active blocks. However, in some embodiments, the scaling properties of widgets can further be managed by assigning a scaling ratio or multiplier to the active blocks (i.e., assigning weight to the blocks). For example, an active block with 0.5× weight will scale at half the rate of an active block with 1× weight. This allows designers change the display pace according to the importance of each widget.

By assigning scaling multipliers to each block, complex weighted systems can be created. These systems allow for each element to be given appropriate importance and individual prominence in the display. In other words, as form-factor changes, the active blocks can scale according to their assigned scaling multiplier with the scaling multiplier being assigned to active block based on the relative importance of the widget contained therein.

The value of scaling multipliers can be determined in several ways. In some embodiments, scaling multipliers can be identified based on an algorithm, user profile, content, or the usage frequency of the widget.

The combined effect of scaling using active blocks and multipliers allows widgets to scale asymmetrically for best-fit within the form-factor. Widgets can scale independently of each other, allowing more important elements to always stay in focus.

Operation/Process

Active Design encourages a comprehensive design workflow that keeps scaling harmony as the top priority. The below process describes operation of Active Design according to one embodiment. It is not necessary to follow the below workflow steps in their specific order nor in their entirety.

Figure 4:
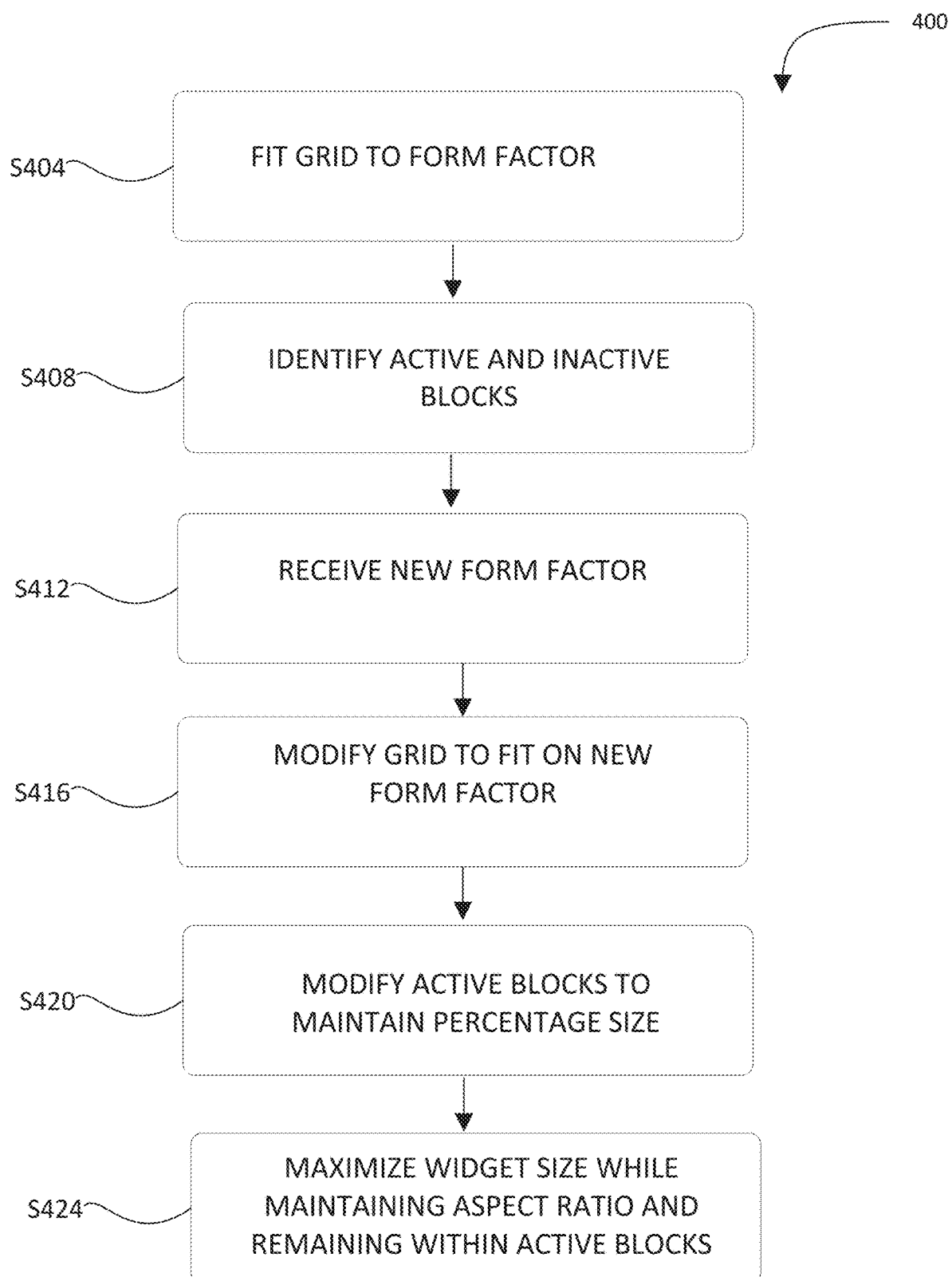
FIG. 4 is a flow diagram depicting one embodiment for adapting content to display across multiple form-factors.

FIG. 4 illustrates a flow diagram of a process 400 for scaling content displayed on a screen. The process 400 begins at S404 where a grid is fitted to a particular form-factor. Next, at S408 the occupied and empty areas on the display screen are identified and assigned active and inactive blocks with widgets being constrained within the bounds of the active blocks. That identification created relative sizing and positioning for all widget within the active block based on the base resolution. The process 400 then moves to state S412 wherein the content to be displayed is sent to a new form-factor that has different dimensions than the form factor on which the display was generated. For instance, the display could have been originally formatted to be viewed on a laptop computer, however a user is now attempting to view the content on a larger desktop computer monitor. At S416, the grid can be modified to fit on the new form-factor. As is described in greater detail above, the grid can be stretched to re-map the grid units for the new display form-factor. For example, for a 1× scaling factor, the grid units will scale alongside the display area while maintaining unit ratios. Next, at S420 the active blocks are scaled to maintain their percentage size within the new form-factor in accordance with the preset multipliers. Finally, at S424, the active display components are maximized within their respective active blocks while maintaining aspect ratio. Each widget finds the maximum height or width that would allow it to fill the active block completely without breaking the boundaries of the active block and while maintaining its aspect ratio. Maintaining aspect ratio of the widgets allows each widget to maximize its size without skewing the elements thereof.

Accordingly, process 400 provides that once form-factor has changed, the grid scales at S416 to match the new display area of S412 and the space and shape of the active blocks change at S420. This allows the widgets within the active blocks to adapt to match the available space at S424. Widgets can scale at different rates depending on the shape, size, and multipliers of the active blocks. Thus, there is greater harmony in the overall design and greater flexibility at the widget level to adapt the display.

Examples of Scaling

There are several ways that an active block may be scaled. Once relative variables have been assigned to each element within the interface, and each Active Block has been defined, the scaling model reads the width and height of the form factor to scale the grid blocks and then utilize the relative measurements to maximize sizes for each widget within the grid block while maintaining its aspect ratio.

All widgets within an active block may maintain their aspect ratio as they find a best-fit within the block. Maintaining the widget's aspect ratio allows each widget to take the most amount of space allowable within its active block without skewing the elements within each widget. The scaling may still depend on a minimum value for the height or width to allow the widget to be usable on the display interface. Additionally, to counter the problem of having a display with too much excessive space, a scaling factor can be used to prevent an overabundance of excess space depending on design preferences.

The combined effect of scaling and using active blocks allows elements to scale asymmetrically for best-fit within the form-factor. This allows widgets to scale independently of each other, allowing more important elements to stay in focus. Grid Blocks carve the positive and negative space within a form factor screen and the widgets can scale to best-fit the space in each active block. This creates an asymmetric scaling effect that adapts the interface to its changing form-factors by allowing each widget to find its independent space within the overall block structure. This ensures there is greater harmony in the overall design and greater flexibility at widget level to adapt. Active Design provides a consistent model to adapt the interface while preserving the intent and importance of relative screen-share for each widget.

Figure 5:
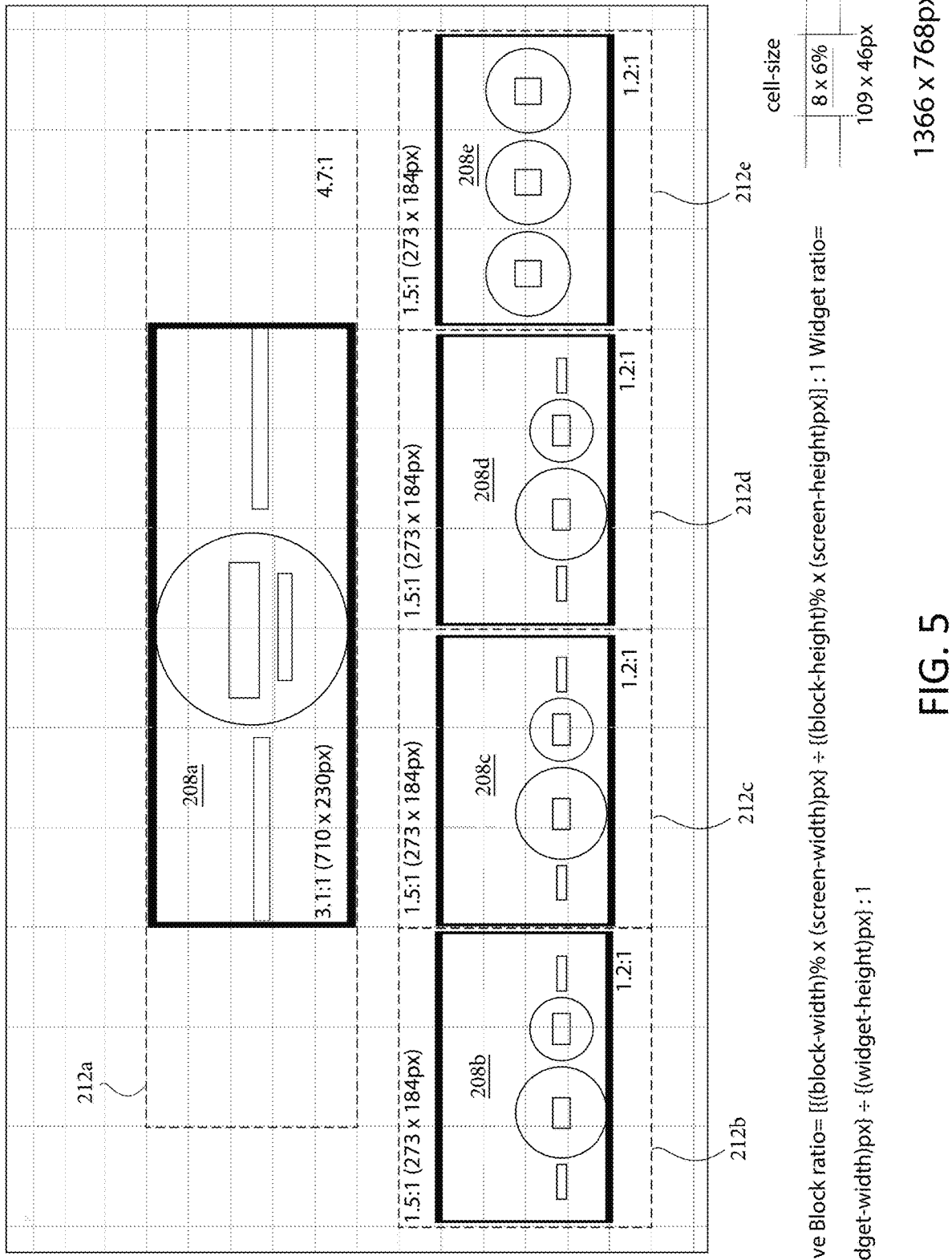
FIG. 5 is an schematic illustration showing a display including widgets and the calculated length, width and height ratios for each widget and active block in a first form factor.
Figure 6:
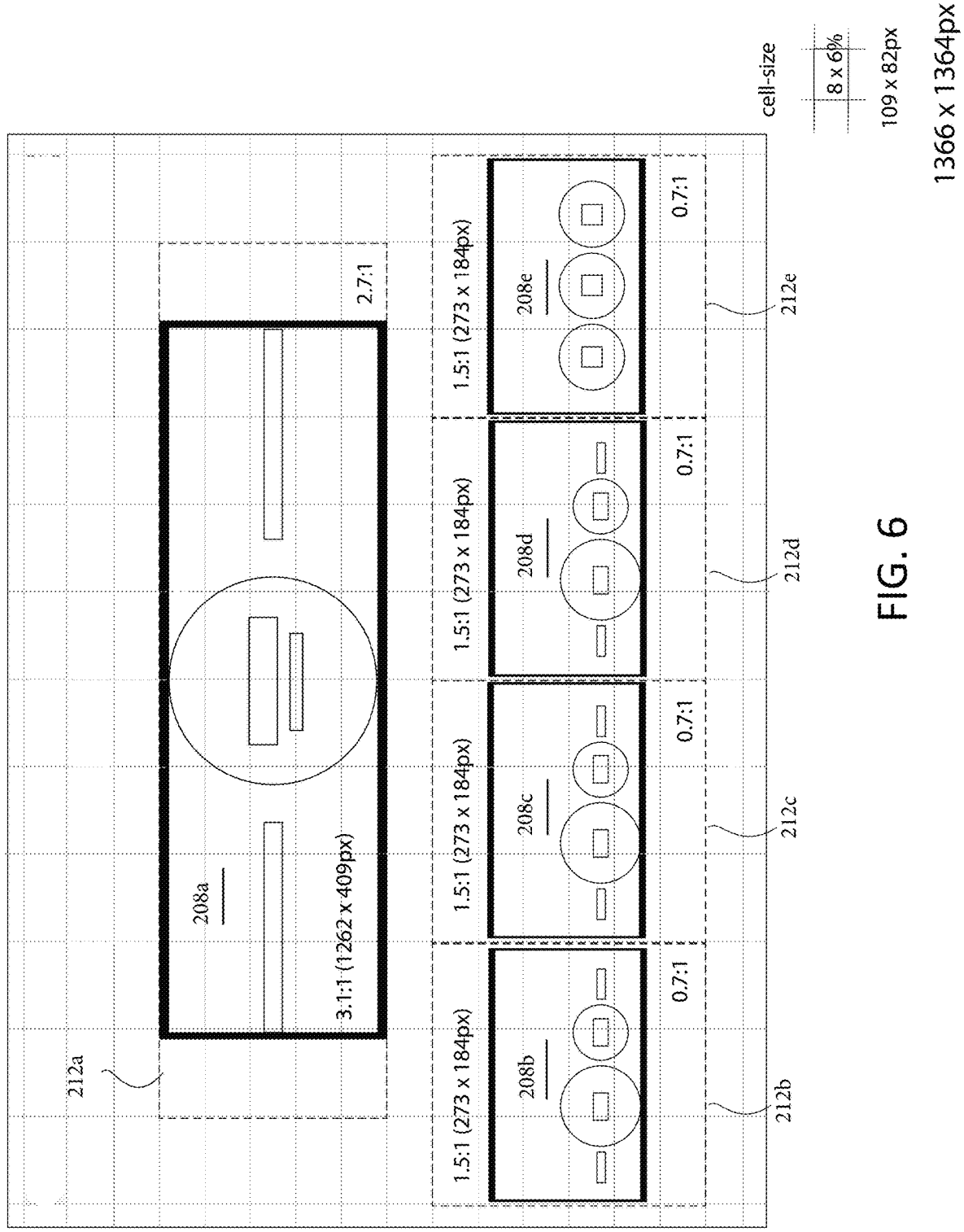
FIG. 6 is an schematic illustration showing a display the widgets and active blocks from FIG. 5, as displayed in a second form factor, along with the calculated length, width and height ratios for each widget and active block.
Figure 7:
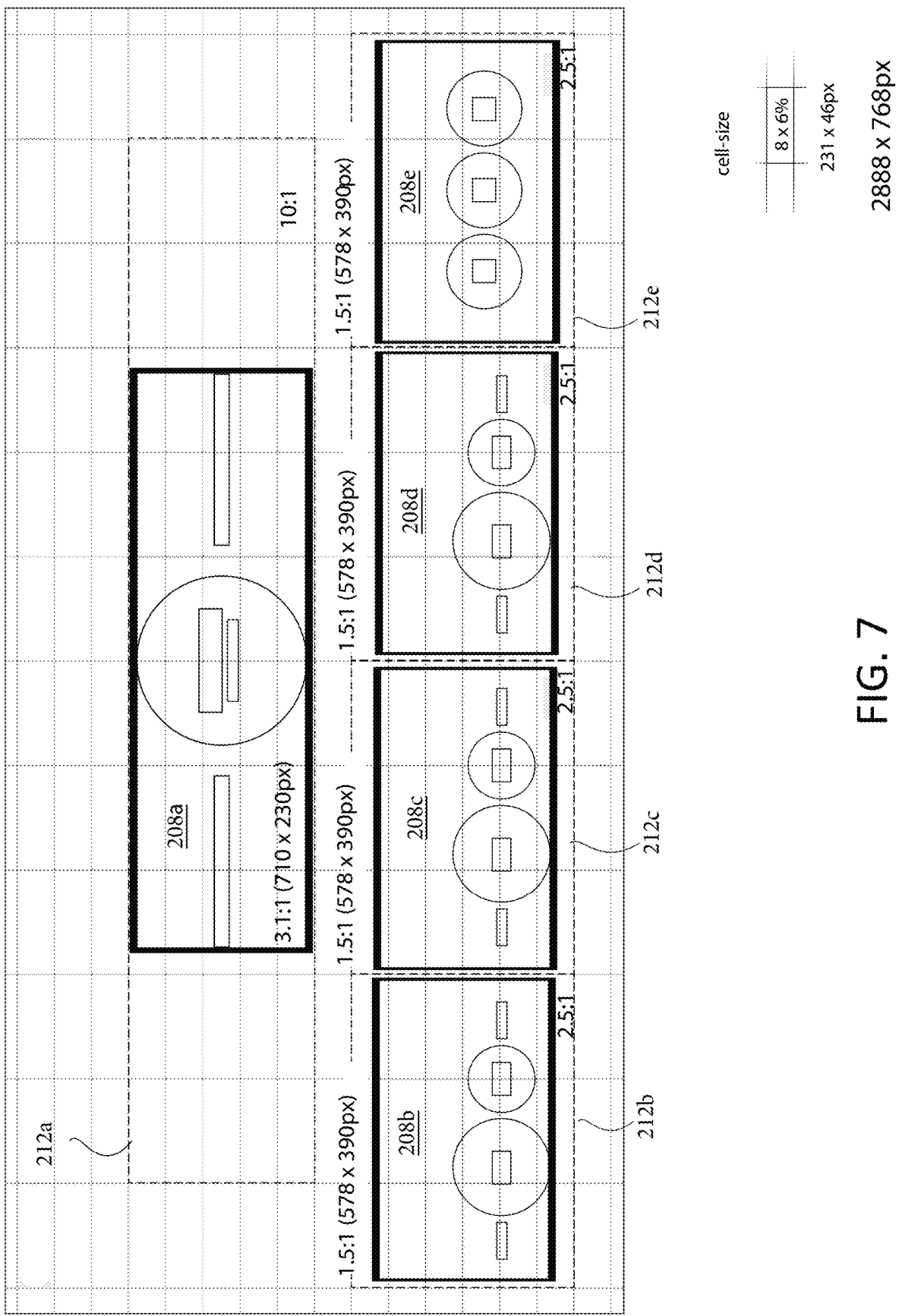
FIG. 7 is an schematic illustration showing a display the widgets and active components from FIG. 5, as displayed in a third form factor, along with the calculated length, width and height ratios for each widget and active block.

FIG. 5 shows one example of the screen from FIG. 2, but displaying a 1366×768 base resolution and indicating the pixel count for each component on the screen along with the scaling ratios of each widget and active block. FIG. 6 shows the same display screen, but scaled to form factor screen with a 1366×1364 pixel resolution. FIG. 7 shows the display screen of FIG. 5 being scaled to being displayed within a form factor screen with a 2888×768 pixel resolution.

In one embodiment, the active block ratio for each active block on the display and the widget ratio for each widget within an active block are calculated as:

Active Block Ratio=[{(block-width %)×(screen width in pixels)} divided by {(block-height %)×(screen height in pixels)}]:1

Widget Ratio={(widget-width in pixels)} divided by {(widget-height in pixels)}:1

The techniques and methods described above offer a variety of advantages, such as reducing developments requirements, developments time, and maintenance burden. Further, the lack of media queries and hidden elements reduces rendering burden on client devices.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An electronic method for scaling and displaying content displayed on a screen to a user, comprising:
    analyzing displayed content to determine active blocks having active display components and blank space areas having no active display components;
    determining a new form factor for the content to be displayed;
    scaling the content to maintain an approximate ratio of active blocks to blank space areas within the new form factor, wherein scaling the content further maintains relative positions of the active blocks and the blank space areas within the new form factor, wherein the active blocks comprise an associated first scaling multiplier that determines a rate that a first active block scales in response to a change in form factor, and wherein the associated first scaling multiplier is determined based on frequency of use of the active display components;
    modifying a size or shape of the active display components within each active display area according to preset parameters to enhance the presentation of data within the active blocks to the user; and
    displaying the active blocks and modified active display components to the user.

2. The method of claim 1 further comprising:
    fitting a grid to a first form factor; and
    scaling the grid to fit the new form factor,
    wherein locations of the active blocks and the blank space areas are defined according to the grid.

3. The method of claim 1, wherein a single base resolution is selected for each category of form-factor.

4. The method of claim 1, wherein modifying the size or shape of the active display components comprises maximizing the size of the active display components while remaining within respective active blocks and while maintaining aspect ratio of the active display components.

5. The method of claim 1, wherein the active display components are configured to asymmetrically scale independent of each other.

6. The method of claim 1, wherein analyzing the displayed content comprises determining a width and height in pixels of the active blocks of the screen.

7. The method of claim 1, wherein analyzing the displayed content comprises determining a width and height in pixels of the active display components residing within the active blocks.

8. The method of claim 1, wherein determining the new form factor comprises reading form factor data from a memory associated with the new form factor.

9. The method of claim 8, wherein the form factor comprises a resolution, a width and height in pixels, or an orientation of the new form factor.

10. The method of claim 1, wherein scaling the content further comprises applying the first scaling multiplier that determines the rate that the active blocks scale in response to the change in form factor.

11. An electronic system for scaling content displayed on a screen to a user, the system comprising:
   a display having a form factor configured to display content from a prior form factor; and
   a processor configured to execute instructions that perform a method comprising:
      analyzing displayed content to determine active blocks having active display components and blank space areas having no active display components;
      determining the form factor of the display;
      scaling the content to maintain an approximate ratio of active blocks to blank space areas within the form factor based on the prior form factor, wherein scaling the content further maintains relative positions of the active blocks and the blank space areas within the form factor, wherein the active blocks comprise an associated first scaling multiplier that determines a rate that a first active block scales in response to a change in form factor, and wherein the associated first scaling multiplier is determined based on frequency of use of the active display components;
      modifying a size or shape of the active display components within each active display area according to preset parameters to enhance the presentation of data within the active blocks to the user; and
      displaying the active blocks and modified active display components to the user in the form factor.

12. The system of claim 11, wherein the associated first scaling multiplier is further determined based on a user profile.

13. The system of claim 11, wherein the associated first scaling multiplier is further determined based on the content of the associated active display component.

14. The system of claim 11, wherein the processor is configured to maximize the size of the active display components while maintaining their aspect ratio, and while constraining the active display components to remain within their active block.

15. The system of claim 11, wherein the active display components are configured to asymmetrically scale independent of each other.

16. The system of claim 11, wherein the processor is configured to analyze the displayed content by determining a width and height in pixels of the active blocks of the display.

17. The system of claim 11, wherein the processor is configured to analyze the displayed content by determining a width and height in pixels of the active display components residing within the active blocks.

18. The system of claim 11, wherein the preset parameters comprise aspect ratio locking parameters, content justification parameters or left or right alignment scaling parameters.

* * * * *